United States Patent [19]
Akagiri et al.

[11] Patent Number: 5,305,155
[45] Date of Patent: Apr. 19, 1994

[54] DIGITAL DATA REPRODUCING APPARATUS

[75] Inventors: Kenzo Akagiri; Yoshiaki Oikawa, both of Kanagawa, Japan

[73] Assignee: Sony Corporation, Tokyo, Japan

[21] Appl. No.: 820,518

[22] Filed: Jan. 15, 1992

[30] Foreign Application Priority Data

Jan. 21, 1991 [JP] Japan .................. 3-041415

[51] Int. Cl.$^5$ .................. G11B 5/00; G11B 5/09
[52] U.S. Cl. .................. 360/32; 360/72.1
[58] Field of Search .................. 360/32, 8, 72.1, 50

[56] References Cited

U.S. PATENT DOCUMENTS

| | | | |
|---|---|---|---|
| 4,544,958 | 10/1985 | Odaka | 360/32 |
| 4,839,750 | 6/1989 | Kato et al. | 360/32 |
| 5,065,259 | 11/1991 | Kubota et al. | 360/32 |
| 5,130,864 | 7/1992 | Shimada | 360/32 |
| 5,146,370 | 9/1992 | Endo et al. | 360/32 |

FOREIGN PATENT DOCUMENTS

| | | | |
|---|---|---|---|
| 4016553 | 11/1991 | Fed. Rep. of Germany | |
| 3-237672 | 10/1991 | Japan | 360/72.1 |

OTHER PUBLICATIONS

Patent Abstracts of Japan, vol. 11, No. 107 (P-563)(2554) 4 Apr. 1987 & JP-A-61 255 536 (Matsushita Electric Ind. Co., Ltd.) 13 Nov. 1986.
Patent Abstracts of Japan, vol. 14, No. 301 (P-1069)(4244) 28 Jun. 1990 & JP-A-2 094 066 (Sony Corp.) 4 Apr. 1990.
Patent Abstracts of Japan, vol. 11, No. 87 (P-557)(2534) 17 Mar. 1987 & JP-A-61 240 493 (Matsushita Electric Ind. Co., Ltd.) 25 Oct. 1986.
Patent Abstracts of Japan, vol. 12, No. 298 (P-744)(3145) 15 Aug. 1988 & JP-A-63 070 988 (Toshiba Corp.) 31 Mar. 1988.
Patent Abstracts of Japan, vol. 13, No. 409 (P-931)(3757) 11 Sep. 1989 & JP-A-1 149 228 (Mitsubishi Electric Corp.) 12 Jun. 1989.
Patent Abstracts of Japan, vol. 6, No. 156 (P-135)(1034) 17 Aug. 1982 & JP-A-57 074 870 (Pioneer K.K.) 11 May 1982.
SMPTE Journal, vol. 90, No. 4, Apr. 1981, U.S. pp. 262-267; Itoh et al.: Audio-Digital Commercial Store.

*Primary Examiner*—Donald Hajec
*Assistant Examiner*—Adrian Young
*Attorney, Agent, or Firm*—William S. Frommer; Alvin Sinderbrand

[57] ABSTRACT

Continuous data is divided into a plurality of portions and then recorded on a recording medium such as a magnetic tape or the like so that, even when a recording medium is exchanged, the divided data thus recorded can be continuously reproduced. During a period in which a recording head is moved to a second recording position after the recording at a first recording position is ended, corresponding data reproduced from a recording medium even when the recording medium is exchanged is written in a memory means in which an input signal applied to an input terminal is written.

7 Claims, 6 Drawing Sheets

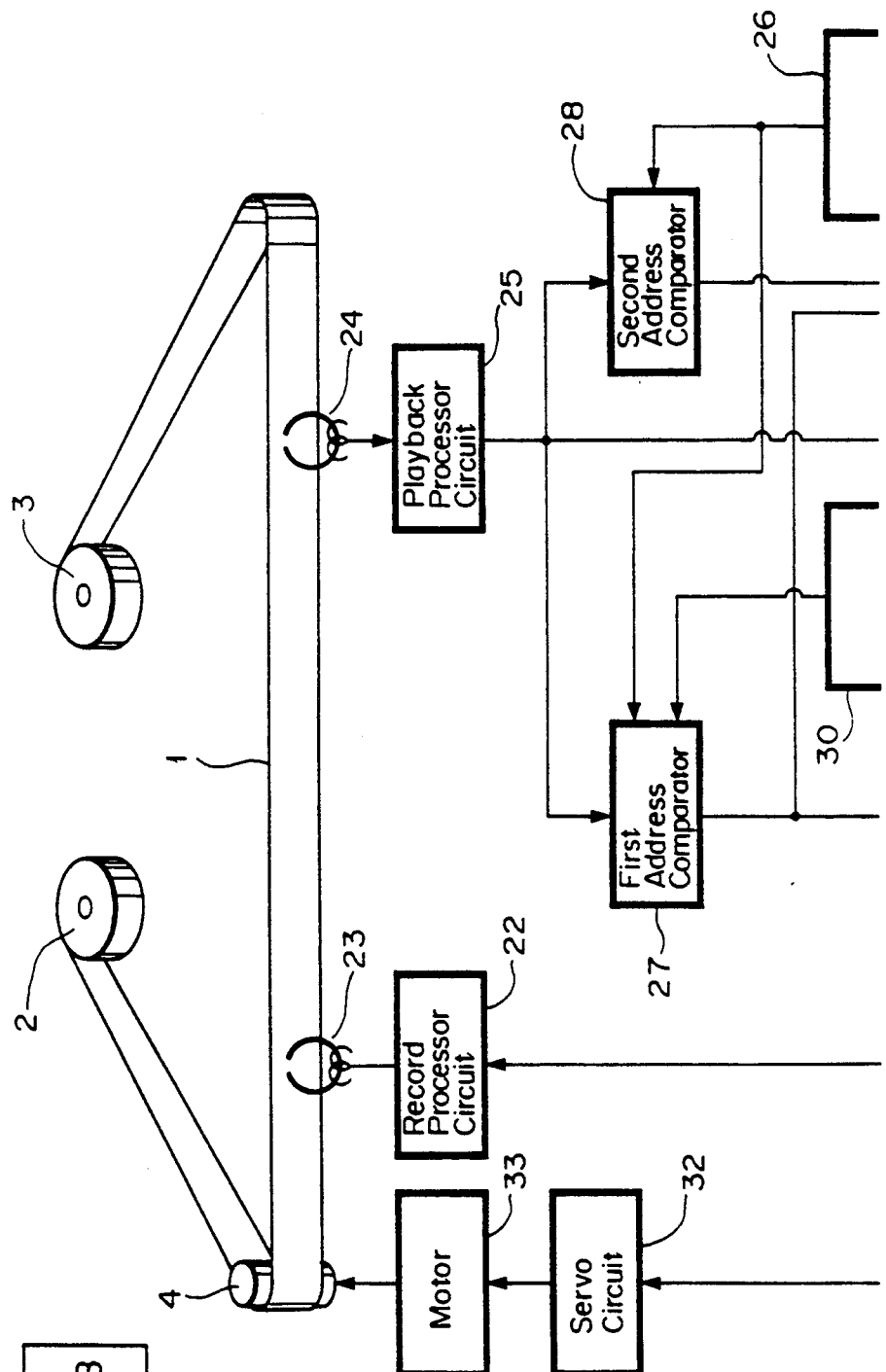

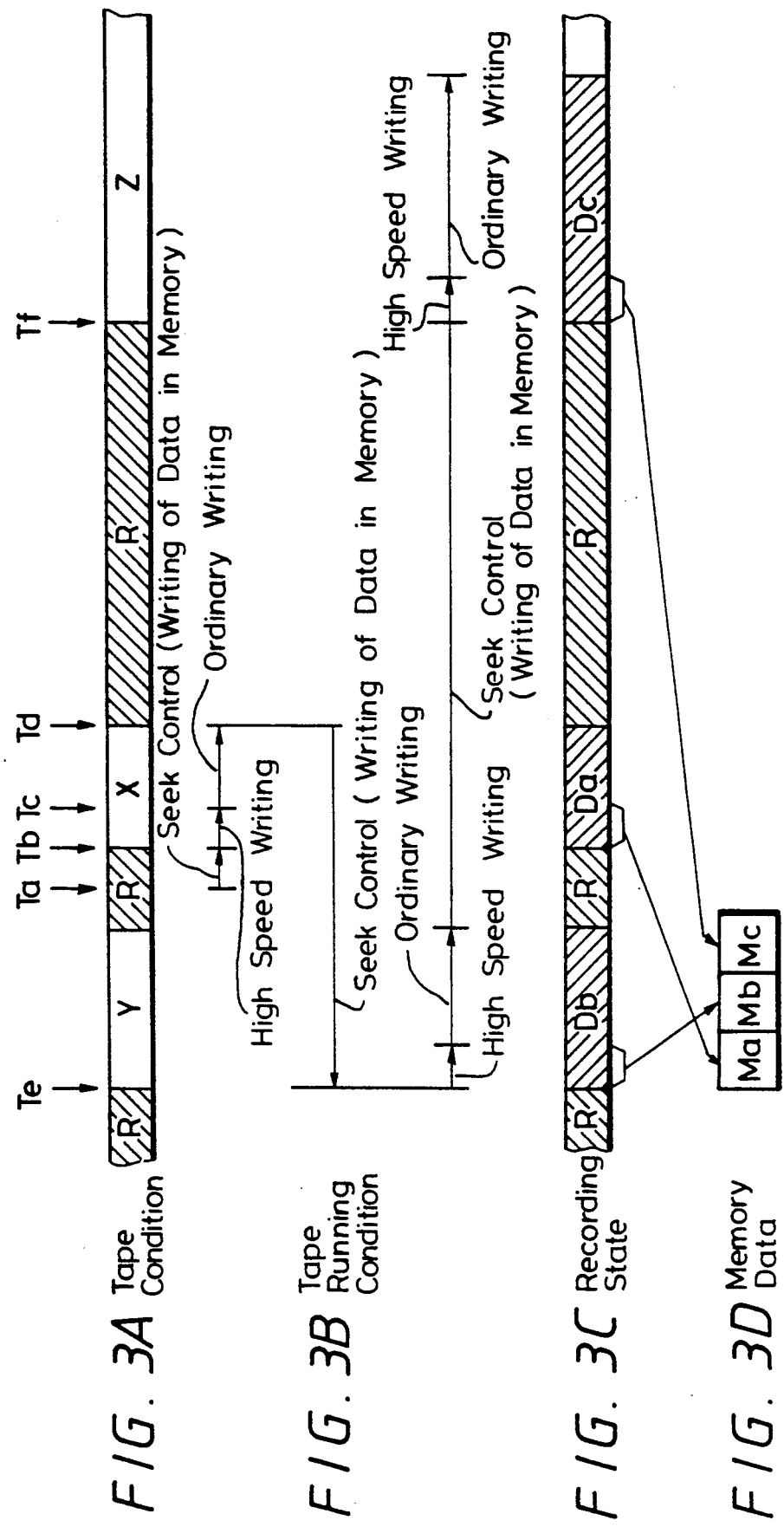

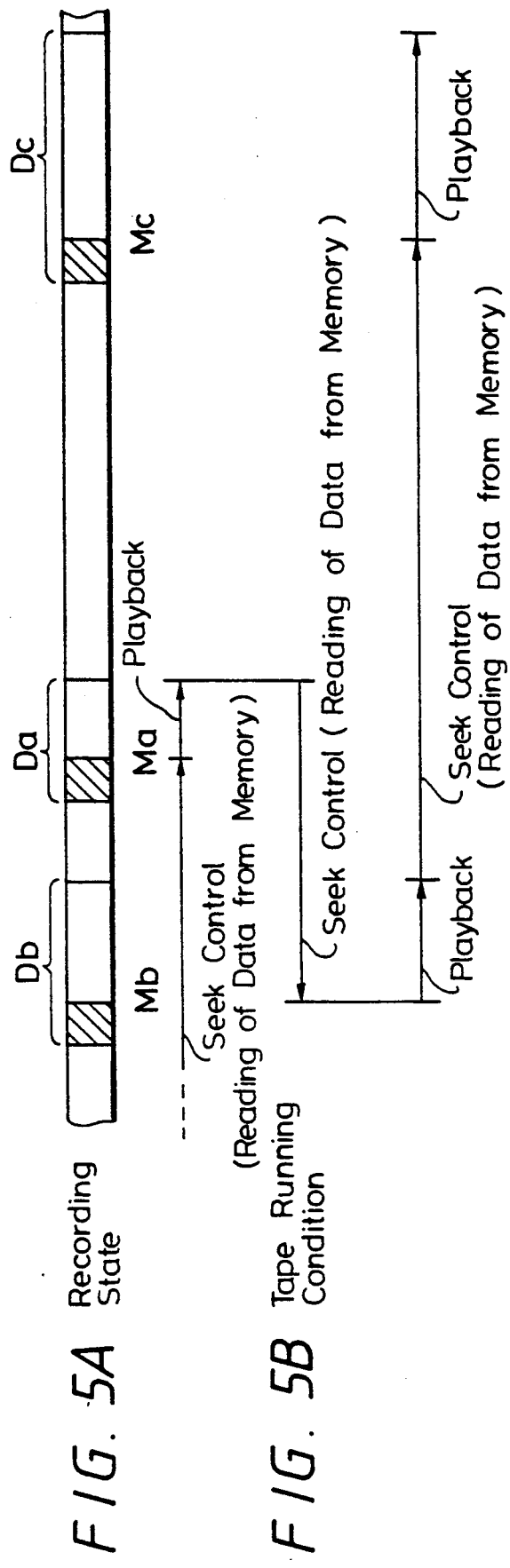

DIGITAL DATA REPRODUCING APPARATUS

BACKGROUND OF THE INVENTION

1. Field of the Invention

The present invention generally relates to digital data reproducing apparatus and, more particularly, is directed to a digital data reproducing apparatus suitably applied to a digital audio tape recorder (DAT), for example.

2. Description of the Prior Art

When data such as a piece of music, conversation and so on is recorded by a conventional tape recorder such as a DAT or the like, then the data is sequentially recorded from the starting portion of a magnetic tape provided as a recording medium. With the above-mentioned arrangement, a piece of music and conversation recorded are reproduced in the sequential order of the recorded data by reproducing the magnetic tape thus recorded from its starting portion.

In case part of recorded data on the magnetic tape thus recorded becomes unnecessary, new data can be recorded on the magnetic tape at its portion in which the unnecessary data is recorded. If the recordable tape length is shorter than data length to be recorded, it is proposed that two recordable portions or more are searched and data are recorded on two recordable portions or more.

However, if a set of continuous data is divided and recorded on two recordable portions or more, upon playback, the starting point of the data recorded next must be detected and then reproduced by transporting the magnetic tape in the fast forward mode or in the rewind mode after the first recorded portion was reproduced, which causes a reproduced sound to be interrupted during the next recorded portion is searched for.

Accordingly, continuous data such as a voice or the like can hardly be recorded discontinuously It is, however, preferable from a utilization factor of the recording medium that continuous data can be recorded on a plurality of divided places. For this reason, it is requested that continuous data such as voice or the like can be recorded discontinuously and recorded data can be reproduced continuously.

An example of a method of obtaining continuous reproduced sound when a set of continuous data is divided and then recorded on a plurality of portions of a recording medium such as a magnetic tape will be described with reference to FIG. 1. In this case, let it be assumed that continuous data is divided and then recorded on three portions of a certain magnetic tape as shown in FIG. 1. More specifically, audio data d1 of a predetermined duration is initially recorded and the next audio data d2 of a predetermined duration is then recorded on the portion distant from the recorded portion of the audio data d1. Further, the next audio data d3 of a predetermined duration is recorded on the portion distant from the recorded portion of the audio data d2. At that time, starting portions m1, m2 of the second and third recorded data d2 and d3 are stored in advance in a memory means of the reproducing apparatus. With this arrangement, upon reproducing, during the recorded portion of the next audio data d2 is searched for by the magnetic head after the first audio data d1 is read out, that is, during a so-called seek control is carried out (during the period in which the magnetic tape is transported in the fast forward mode during an interval shown by s1 in FIG. 1), the data m1 recorded on the starting portion of the audio data d2 stored in the memory means is read out and the reproduced sound during the seek control can be obtained on the basis of the data m1. Similarly, during the recorded portion of the next audio data d3 is searched for by the magnetic head after the audio data data d2 is read out, that is, during a seek control is carried out (during the period in which the magnetic tape is transported in the fast forward mode in an interval shown by s2 in FIG. 1), the data m2 recorded on the starting portion of the audio data d3 stored in the memory means is read out and then the reproduced sound during the seek control can be obtained on the basis of the data m2.

If the reproducing apparatus is provided with memory means for storing data of the starting portions of the respective recorded blocks, even data recorded on a plurality of discontinuous divided portions can be reproduced continuously.

Although the recording and/or reproducing apparatus employing the memory means for storing data of the starting portions of the respective recorded blocks may utilize data of the starting portions of the respective recorded blocks stored in the memory means in the recording mode in order to reproduce the magnetic tape recorded thereby, this recording and/or reproducing apparatus cannot reproduce a magnetic tape on which audio data or the like are divided and then recorded on a plurality of portions by other recording apparatus without difficulty. In other words, if the recorded magnetic tape is merely installed in the reproducing apparatus, then it is impossible to reproduce data continuously because data of the starting portions of the respective recorded blocks are not stored in the memory means.

OBJECTS AND SUMMARY OF THE INVENTION

Therefore, it is an object of the present invention to provide an improved digital data reproducing apparatus in which the aforesaid shortcomings and disadvantages of the prior art can be eliminated.

More specifically, it is an object of the present invention to provide a digital data reproducing apparatus in which continuous data divided and recorded in a plurality of portions can be reproduced continuously even when a recording medium such as a magnetic tape or the like is exchanged.

As an aspect of the present invention, a digital data reproducing apparatus for reproducing continuous digital data from a recording medium on which the continuous digital data is divided into at least two portions each of which is recorded at spaced apart location of the recording medium from each other, the digital data reproducing apparatus is comprised of a searching circuit for searching a beginning portion of at least one of the portions and for generating a detected output when the recording medium is installed in the reproducing apparatus, a memory for storing the digital data, a memory control circuit for controlling the memory such that the beginning portion of at least one of the portions is written in the memory when the detected output is generated, a reproducing circuit for reproducing a first portion of the continuous digital data by a reproducing head, a moving device for moving the reproducing head into a following location at which a second portion of the continuous digital data is recorded, and a circuit for reading out the digital data from the memory while the reproducing head is moved, whereby the first and second portions of the continuous digital data are reproduced continuously.

The preceding and other objects, features and advantages of the present invention will become apparent from the following detailed description of an illustrative embodiment thereof to be read in conjunction with the accompanying drawings, in which like reference numerals are used to identify the same or similar parts in the several views.

BRIEF DESCRIPTION OF THE DRAWINGS

FIGS. 3A through 3D are respectively schematic diagrams used to explain recorded state of data;

FIGS. 5A and 5B are respectively schematic diagrams used to explain the reproduced state of data.

DETAILED DESCRIPTION OF THE PREFERRED EMBODIMENT

The present invention will now be described with reference to the accompanying drawings.

Figure 1:
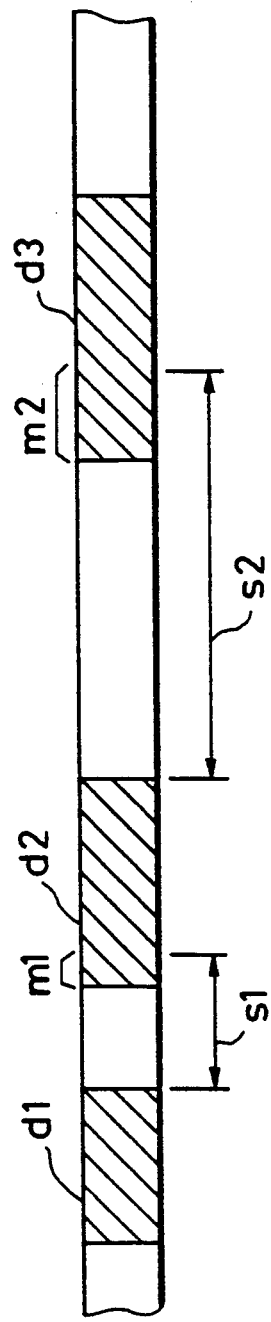
FIG. 1 is a schematic diagram used to explain the recorded state of data.
Figure 2B:
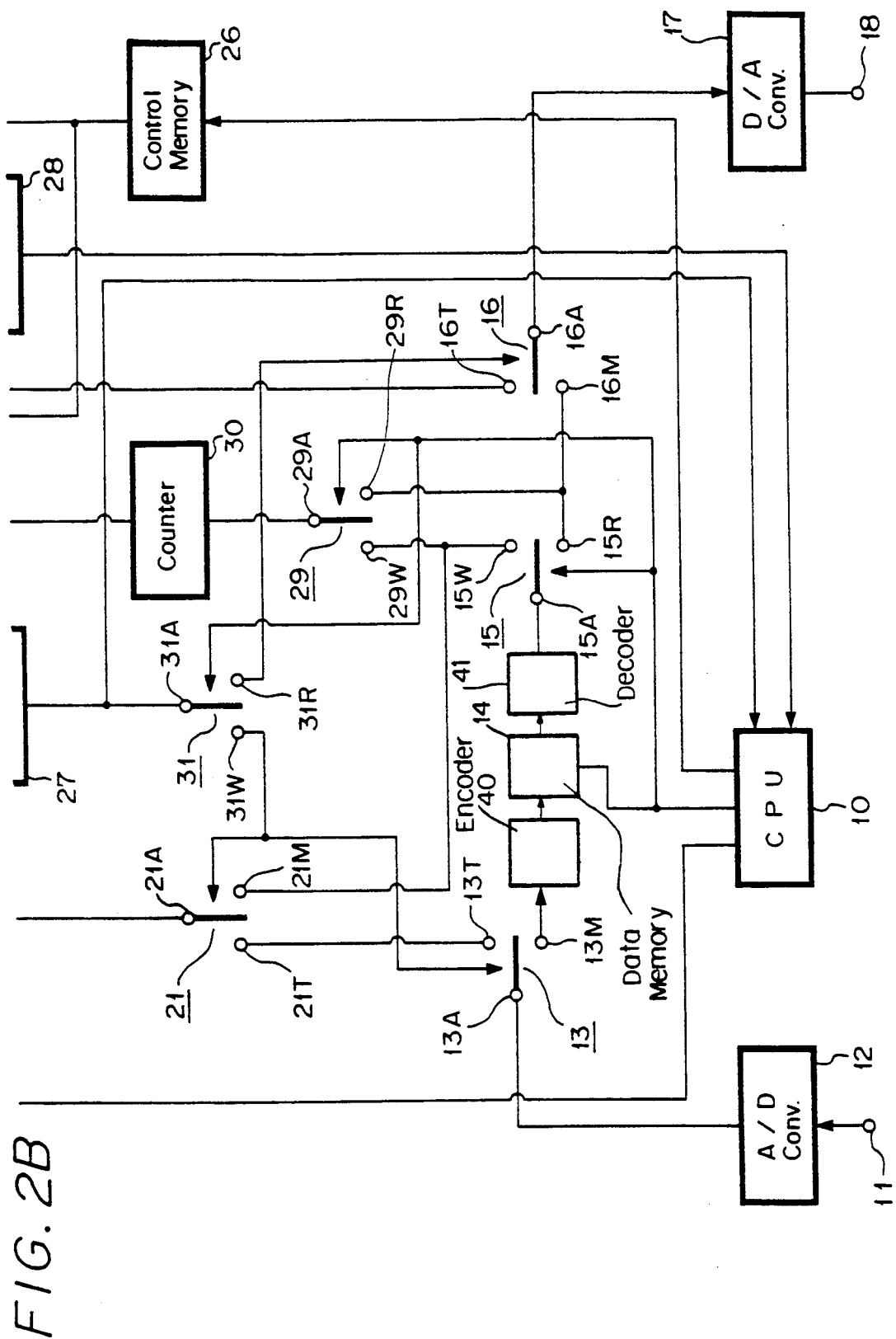
FIG. 2, which is formed of FIGS. 2A and 2B drawn on two sheets of drawings so as to permit the use of a suitably large scale, is a schematic block diagram showing an embodiment of a digital data reproducing apparatus according to the present invention.

FIG. 2, which is formed of FIGS. 2A and 2B drawn on two sheets of drawings so as to permit the use of a suitably large scale, is a schematic block diagram showing an overall arrangement of a signal recording and/or reproducing apparatus to which the present invention is applied.

Referring to FIG. 2, a magnetic tape 1 is shown and various data such as a digital audio signal or the like are recorded on this magnetic tape 1. Also, recorded data are reproduced from the magnetic tape 1. The magnetic tape 1 is supplied from a supply reel 2 and wound around a take-up reel 3. In use, the running condition of the magnetic tape 1 is controlled by a capstan 4. The capstan 4 is driven by a motor 33 and the motor 33 is servo-controlled by a servo circuit 32 on the basis of an instruction issued from a central processing unit (CPU) 10 which controls the recording and playback of this signal recording and/or reproducing apparatus.

A recording signal input terminal 11 is shown and an analog audio signal applied to the input terminal 11 is converted into a digital audio signal by an analog-to-digital (A/D) converter 12. The digital audio signal from the A/D converter 12 is supplied to a movable contact 13A of a first change-over switch 13. The first change-over switch 13 is changed in position by a control signal developed at a first fixed contact 31W of a change-over switch 31 which will be described later. The digital audio signal developed at a first fixed contact 13M (memory side contact: i.e., contact connected when a memory is operated) of the first change-over switch 13 is supplied through an encoder 40 to a data memory 14 and written therein. Write and read of data in the data memory 14 are controlled by the CPU 10 and the data supplied to the data memory 14 is compressed in the encoder 40 by a high efficiency coding method and then written therein.

A digital audio signal developed at a second fixed contact 13T (tape side contact: contact connected when a signal is recorded on or reproduced from the magnetic tape 1) of the first change-over switch 13 is supplied to a first fixed contact 21T (tape side contact) of a second change-over switch 21. The second change-over switch 21 also is changed in position by the control signal developed at the first fixed contact 31W of the change-over switch 31 which will be referred to later. The digital audio signal developed at a movable contact 21A of the second change-over switch 21 is supplied to a recording processor circuit 22 and a digital audio signal processed by the recording processor circuit 22 in a predetermined recording fashion is supplied to a recording head 23, thereby recorded on a predetermined track of the magnetic tape 1 by the recording head 23. In this case, the recording head 23 might be formed as a rotary head similarly to a playback head 24, which will be described later, and the digital audio signal is recorded on slant tracks of the magnetic tape 1. When data temporarily recorded on the data memory 14 is recorded on the magnetic tape 1, a header information is inserted into a subcode of recorded data in the form of a predetermined identifying code by the recording processor circuit 22. Further, a predetermined ID code is inserted into audio data recorded at every predetermined unit. When these ID codes are inserted into the subcode, then informations of addresses (tape positions) at which these ID codes are inserted are also stored in a control memory 26, which will be described later, under the control of the CPU 10.

The digital audio signal read out from the data memory 14 is supplied through a decoder 41 to a movable contact 15A of a third change-over switch 15. The third change-over switch 15 is changed in position by the CPU 10. A digital audio signal developed at a first fixed contact 15W (write side contact: contact connected when data is written in the memory) of the third change-over switch 15 is supplied to the second fixed contact 21M (memory side contact) of the change-over switch 21 and a first fixed contact 29W (write side contact) of a fourth change-over switch 29. The fourth change-over switch 29 is changed in position by the CPU 10. A digital audio signal developed at a movable contact 29A of the fourth change-over switch 29 is supplied to a counter 30. The counter 30 is adapted to count data length (i.e., the number of blocks) corresponding to the address of the digital audio signal read out from the data memory 14 and to supply its count data to a first address comparator 27.

A digital audio signal developed at a second fixed contact 15R (read-out side contact: contact connected when data is read out from the memory) of the third change-over switch 15 is supplied to a second fixed contact 29R (read-out side contact) of the fourth change-over switch 29 and a first fixed contact 16M (memory side contact) of a fifth change-over switch 16. The fifth change-over switch 16 is changed in position by the control signal developed at a second fixed contact 31R of the change-over switch 31 which will be described later.

A playback head 24 is provided and the digital audio signal reproduced from the magnetic tape 1 by this playback head 24 is supplied to a playback processor circuit 25. The digital audio signal processed by the playback processor circuit 25 in a predetermined playback fashion is supplied to a second fixed contact 16T (tape side contact) of the fifth change-over switch 16 and first and second address comparators 27 and 28. A digital audio signal developed at a movable contact 16A of the fifth change-over switch 16 is supplied to a digital-to-analog (D/A) converter 17 and an analog audio signal converted by the D/A converter 17 is fed to a reproduced signal output terminal 18.

The control memory 26 is adapted to control the recording position of data. Address data illustrative of a present tape position and which is read out from the control memory 26 under the control of the CPU 10 is supplied to the first and second address comparators 27 and 28. In this case, the control memory 26 stores therein all address informations concerning the magnetic tape 1 which is installed in this apparatus so that address informations such as address at which informations can be recorded, address used to perform the seek control during the playback mode or the like can be determined on the basis of the stored informations in the control memory 26. Address information stored in the control memory 26 might be recording address of data temporarily stored in the data memory 14, for example, and which is recorded on the magnetic tape 1. Then, the address information of the control memory 26 is automatically recorded in the recording mode if a magnetic tape is the magnetic tape 1 which is recorded by this recording and/or reproducing apparatus. If on the other hand the magnetic tape is the magnetic tape 1 which is recorded by other recording apparatus, when this magnetic tape 1 is installed in this reproducing apparatus, then the magnetic tape 1 is searched from the top to the end at high speed to read out subcode and the subcode thus read out is stored in the control memory 26 on the basis of the read-out information. This high speed search is carried out at speed 40 times as high as the normal playback speed.

In this embodiment, during the high speed search mode, the information concerning the recording address of data temporarily recorded on the data memory 14 and which is recorded on the magnetic tape 1 is detected. Thus, when the detected information is stored in the control memory 26, recording data of associated address is sequentially reproduced from the magnetic tape 1 and reproduced data is stored in the data memory 14. That is, when the magnetic tape 1, which is recorded by the apparatus other than this recording and/or reproducing apparatus (or when the magnetic tape 1, which is recorded by this apparatus and which is temporarily ejected from this apparatus), is installed in this recording and/or reproducing apparatus, data necessary for the playback mode is stored beforehand in the data memory 14 under the control of the CPU 10. The data stored in the data memory 14 can be judged by the header information inserted into the subcode of the recording data.

The first address comparator 27 compares the address data read out from the control memory 26 and data counted by the counter 30. A compared result is supplied to the CPU 10 and a switching control signal based on the compared result is supplied to a movable contact 31A of the sixth change-over switch 31. Then, the first and second change-over switches 13 and 21 are changed in position on the basis of the switching control signal developed at the first fixed contact 31W (write side contact) of the change-over switch 31.

Further, the fifth change-over switch 16 is changed in position on the basis of a switching control signal developed at the second fixed contact 31R (read-out side contact) of the change-over switch 31.

The second address comparator 28 compares the address data read out from the control memory 26 and address data supplied from the playback processor circuit 25 on the basis of the reproduced signal from the playback head 24 and supplies a compared result to the CPU 10.

Operation in which an audio signal is recorded by this signal recording and/or reproducing apparatus will be described with reference to FIGS. 3A through 3D and FIG. 4.

When an audio signal is recorded on the magnetic tape 1, the movable contacts 15A, 29A and 31A of the third, fourth and sixth change-over switches 15, 29 and 31 are connected to the write side contacts 15W, 29W and 31W under the control of the CPU 10. Then, by the switching control signal supplied from the first address comparator 27 through the sixth change-over switch 31, the movable contacts 13A and 21A of the first and second change-over switches 13 and 21 are connected to the memory side contacts 13M and 21M.

In this case, the magnetic tape 1 has discontinuous recorded data R which cannot be erased and new data can be written (recorded) on the magnetic tape 1 at its portion where recorded data R are not provided as, for example, shown in FIG. 3A. Further, the recording head 23 and the playback head 24 are able to record and/or reproduce an address position Ta provided in the recorded place of a certain recorded data R.

Figure 4:
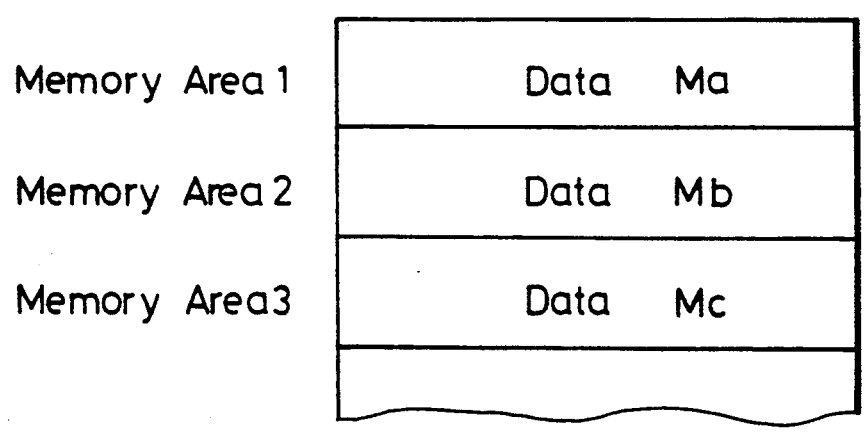
FIG. 4 is a schematic diagram used to explain the state such that a memory is utilized in actual practice according to the embodiment of the present invention.

In this state, if an audio signal to be recorded is supplied to the input terminal 11, then this input audio signal is converted into a digital audio signal and temporarily written in the data memory 14 through the first change-over switch 13. When the digital audio signal is written in the data memory 14, data is compressed in the encoder 40 by the high efficiency coding method and written in a memory area 1 as shown in FIG. 4, for example. During the digital audio signal is written in the data memory 14, the CPU 10 supplies an instruction to the servo circuit 32 to transport the magnetic tape 1 at high speed, thereby carrying out the seek control in which a starting portion Tb of a data recordable area X of the nearest address position. The CPU 10 determines the recordable area X from data stored in the control memory 26 and finds out the starting portion of the recorded digital audio signal by detecting a coincidence between the address instructed by the control memory 26 and the address obtained from the reproduced signal of the playback head 24.

When this tape position Tb is detected, then the digital audio signal written in the memory area 1 of the data memory 14 is timebase-compressed and read out while the magnetic tape 1 is being transported at high speed. Then, the timebase-compressed digital audio signal thus read out is supplied through the third and second change-over switches 15 and 21 to the recording head 23, thereby the digital audio signal being written on the magnetic tape 1 at high speed. When the digital audio signal is read out from the data memory 14, the digital audio signal is read out from the data memory 14 in response to a high speed clock corresponding to the transport speed of the magnetic tape 1 and the digital audio signal thus read out is timebase-compressed. During the digital audio signal is written on the magnetic tape 1 at high speed, a header information indicating that the digital audio signal is read out from the data memory 14 and then recorded on the magnetic tape 1 is added to the subcode of data to be written by the recording processor circuit 22. An address information stored in the control memory 26 also is added with a header information indicating that the digital audio signal is read out from the data memory 14 and then written on the magnetic tape 1. Since the digital audio signal is written on the magnetic tape 1 at high speed, all digital audio signals written in the data memory 14 are read out at a tape position Tc after a predetermined time from the start of the high speed writing and the timing of the digital audio signal becomes coincident with that of the input audio signal.

At that time, by the control of the first address comparator 27, the movable contacts 13A and 21A of the first and second change-over switches 13 and 21 are connected to the tape side contacts 13T and 21T, allowing the digital audio signal from the A/D converter 12 to be directly supplied to the recording head 23. Therefore, the ordinary writing is carried out, in which the input audio signal is written on the magnetic tape 1 not through the data memory 14. In this case, the magnetic tape 1 is transported at the normal speed from the tape position Tc under the control of the CPU 10.

Operation of the first address comparator 27 will be described below.

The counter 30 is supplied with data (digital audio signal) read out from the data memory 14 through the fourth change-over switch 29 and the data length thereof is counted by the counter 30. Count data from the counter 30 is supplied to the first address comparator 27 which compares address data of the present tape position supplied from the control memory 26 and the count data. The first address comparator 27 determines at a timing point in which both data are coincident that all digital audio signals written in the data memory 14 are read out, and generates the switching control signal by which the first and second change-over switches 13 and 21 are connected to the tape side contacts 13T and 21T. This switching control signal is also supplied to the CPU 10 which enables the magnetic tape 1 to be transported at the normal tape speed.

When the digital audio signal is written at the normal tape speed which does not need the data memory 14 and the writing reaches an end portion Td of the data recordable area X, then the movable contacts 13A and 21A of the first and second change-over switches 13 and 21 are connected to the memory side contacts 13M and 21M again. Then, the digital audio signal from the A/D converter 12 is compressed by a predetermined compressing ratio and then written in the data memory 14. At that time, the digital audio signal is written in a memory area 2 next to the above-mentioned memory area 1 in FIG. 4.

The first and second change-over switches 13 and 21 are switched by comparing the address data of the present tape position supplied from the control memory 26 and the present count data.

While the digital audio signal is being written as described above, the magnetic tape 1 is transported at high speed and the seek control is carried out to detect the starting portion of the tape position Te of the data recordable area Y of the next address position. At that time, the magnetic tape 1 is transported in the opposite direction.

When the starting portion of the tape position Te is detected, then the magnetic tape 1 is transported at high speed in the positive direction to thereby read out the digital audio signal written in the memory area 2 of the data memory 14. Then, the digital audio signal thus read out is supplied through the third and second change-over switches 15 and 21 to the recording head 23, thereby the digital audio signal being written in the magnetic tape 1 at high speed. Also in that event, by the processing in the recording circuit 22, the subcode of data to be written is added with a header information indicating that the digital audio signal is read out from the data memory 14 and then recorded in the magnetic tape 1.

When the digital audio signal becomes coincident with the input audio signal in timing during the digital audio signal is written in the magnetic tape 1 at high speed, the digital audio signal is written in the end portion of the data recordable area Y in the normal writing mode. At the end portion of the data recordable area Y, the seek control is carried out to detect the first tape position Tf of a data recordable area Z of the next address position while the input audio signal is being written in the data memory 14 again. Accordingly, the digital audio signal is successively recorded on the magnetic tape 1 at its portion where the unerasable recorded data R is not provided similarly until an audio signal is input to the input terminal 11.

If the recording (writing) of the audio signal is ended in the data recordable area Z, continuous audio signals Da, Db and Dc (see FIG. 3C) are recorded on data recordable areas X, Y and Z (see FIG. 3A). In this case, during the seek control, data temporarily stored in the data memory 14 and written in the magnetic tape 1 at high speed is stored in the data memory 14. That is, when the recording is ended, then data Ma, Mb and Mc (see FIG. 3D) written in the magnetic tape 1 at high speed are left in the memory areas 1, 2 and 3 within the data memory 14 as shown in FIG. 4 and data in the memory areas 1, 2 and 3 are stored in the data memory 14. The data Ma, Mb and Mc thus stored are utilized in the playback mode which will be described below.

Operation in which the audio signal recorded by this signal recording and/or reproducing apparatus is played back will be described with reference to FIGS. 5A and 5B.

When the recorded audio signal is reproduced from the magnetic tape 1, then an address information of the reproduced portion is read out from the control memory 26 at first and the CPU 10 controls the playback on the basis of the address information thus read out. Explaining the address information stored in the control memory 26, it is to be noted that this address information might be an information (header information) concerning the recording address of data temporarily stored in the data memory 14 upon recording and which is then recorded on the magnetic tape 1. When audio data intermittently recorded on the magnetic tape 1 are reproduced continuously, the CPU 10 determines the address having the header information on the basis of the data stored in the control memory 26, thereby controlling the playback. More specifically, upon playback, under the control of the CPU 10, the movable contacts 15A, 29A and 31A of the third, fourth and sixth change-over switches 15, 29 and 31 are connected to the read-out side contacts 15R, 29R and 31R. Then, the movable contact 16A of the fifth change-over switch 16 is connected to the memory side contact 16M by the switching control signal supplied from the first address comparator 27 through the sixth change-over switch 31.

When the data Da, Db and Dc (see FIG. 5A) intermittently recorded as described above are reproduced, the seek control (fast forward or rewind) is carried out to detect the starting portion of the recorded area of the first recorded data Da. During the seek control is carried out, the data Ma for the starting portion of the data Da stored in the data memory 14 is read out from the data memory 14 and supplied through the decoder 41 and the fifth change-over switch 16 to the D/A converter 17. Then, an analog audio signal from the D/A converter 17 is delivered from the output terminal 18. In that event, the data Ma is expanded in the decoder 41 with a ratio corresponding to the compressing ratio upon writing and then read out. An expanding ratio is similarly set when other data are read out.

When the starting portion of the recorded area of the data Da is detected by this seek control, then the magnetic tape 1 is transported in the fast forward mode by the amount corresponding to the read-out portion of the data Ma from this data memory 14. Further, when the first address comparator 27 detects a coincidence between the address of the data Ma read-out from the data memory 14 and the address of the present tape position, the first address comparator 27 generates a switching control signal by which the movable contact 16A of the fifth change-over switch 16 is connected to the tape side contact 16T. By this switching of the fifth change-over switch 16, the digital audio signal based on the reproduced output of the playback head 24 is supplied to the D/A converter 17 and an audio signal, provided by reproducing the magnetic tape 1 up to the end portion of the recording area of the data Da by the playback head 24, is delivered from the output terminal 18.

When the magnetic tape 1 is reproduced up to the end portion of the recording area of the data Da, then the first address comparator 27 detects this playback on the basis of the address position and allows the fifth change-over switch 16 to connect again the movable contact 16A to the memory side contact 16M. Then, the seek control is carried out to detect the starting portion of the recorded area of the data Db recorded next at high speed. During this seek control, the data Mb corresponding to the starting portion of the data Db and which is preserved in the data memory 14 is read out and the analog audio signal of the data Mb converted by the D/A converter 17 is delivered from the output terminal 18.

When the starting portion of the recorded area of the data Db is detected by this seek control, the magnetic tape 1 is transported by the amount corresponding to the amount of the data Mb read out from the data memory 14 in the fast forward mode. When the coincidence between the address of the data Mb read out from the data memory 14 and the address indicative of the present tape position is detected by the first address comparator 27, the movable contact 16A of the fifth change-over switch 16 is connected to the tape side contact 16T and the audio signal based on the reproduced output of the playback head 24 is delivered from the output terminal 18.

When the magnetic tape 1 is reproduced at its end portion of the recorded area of the data Db, then the movable contact 16A of the fifth change-over switch 16 is connected to the memory side contact 16M. Then, the seek control is carried out to detect the starting portion of the recorded are of the data Dc recorded next at high speed. Also, the data Mc at its starting portion of the data Dc and which is stored in the data memory 14 is read out and the analog audio signal of the data Mc is delivered from the output terminal 18. Similarly, so long as the recording of a set of audio signals is continued, the seek control of the next recorded portion and the output of the audio signal read out from the memory 14 during the seek control are carried out alternately.

According to the recording and/or reproducing apparatus of this embodiment, since the continuous input audio signal is recorded on the magnetic tape 1 discontinuously in a real time fashion and also various data such as the continuous audio data or the like are recorded by utilizing the data erasable portion (or unnecessary data recorded portion) of the magnetic tape 1, the magnetic tape 1 can be recorded efficiently. Further, when data discontinuously recorded is reproduced, then such data can be continuously output in a real time fashion. Thus, in the playback mode, such data can be processed similarly to the data (audio signal) continuously recorded. There is then no disadvantage on behalf of the fact that the recorded portions are discontinuous. In this embodiment of the present invention, when the magnetic tape 1 is installed in the recording and/or reproducing apparatus, the magnetic tape 1 is reproduced from the starting end to the ending end during the high speed search mode to thereby detect the recorded state. If the portion in which data is recorded discontinuously is detected, then upon playback, data of the portion which needs the data memory 14 is stored in the data memory 14. Thus, even when the magnetic tape 1 is exchanged, then data discontinuously recorded can be constantly reproduced continuously. Accordingly, so long as the reproducing apparatus is in accordance with the same standards, the magnetic tape 1 can be installed and exchanged freely. Furthermore, by carrying out the above search when the magnetic tape 1 is installed in the reproducing apparatus, the non-recorded portion of the tape can be immediately determined on the basis of the searched result when the recorded magnetic tape 1 is installed in the reproducing apparatus, thus making it possible to easily determine the portion in which new data can be recorded.

While the present invention is applied to the audio signal recording and/or reproducing apparatus as described above, the present invention is not limited thereto and may be applied to a recording and/or reproducing apparatus for recording and/or reproducing a variety of other data. In addition, while the magnetic tape is employed as the recording medium as described above, the present invention is not limited thereto and other recording media such as a disc or the like may be utilized.

According to the present invention, the signal recorded on a plurality of arbitrary positions of the recording medium can be continuously read out in a real time fashion and discontinuously recorded data can be reproduced similarly to the data recorded continuously. In this case, since data stored in the memory means and which is read out during the playback head is moved is automatically stored in the memory means when the recording medium is installed in the reproducing apparatus, the data discontinuously recorded can be reproduced continuously even though the recording medium is exchanged, thus making it possible to exchange the recording medium freely.

Having described the preferred embodiment of the invention with reference to the accompanying drawings, it is to be understood that the invention is not limited to that precise embodiment and that various changes and modifications thereof could be effected by one skilled in the art without departing from the spirit or scope of the novel concepts of the invention as defined in the appended claims.

What is claimed is:

1. A digital data reproducing apparatus for reproducing continuous digital data from a recording medium on which said continuous digital data is divided into at least first and second portions which are respectively recorded at first and second locations of said recording medium which are spaced apart from each other, said digital data reproducing apparatus comprising:
   (a) searching means for searching a beginning part of at least said second portion when said recording medium is installed in said reproducing apparatus and for generating a detected output when the beginning part is found;
   (b) memory means for storing the digital data;
   (c) memory control means for controlling said memory means such that the beginning part of at least said second portion is written in said memory means when said detected output is generated;
   (d) reproducing means for reproducing said first portion of said continuous digital data by a reproducing head;
   (e) moving means for moving said reproducing head and said recording medium relative to each other so that said reproducing head relatively moves from said first location to said second location; and
   (f) means for reading out the beginning part of said second portion from said memory means while said reproducing head relatively moves from said first location to said second location, whereby said first and second portions of said continuous digital data are reproduced continuously.

2. A digital data reproducing apparatus according to claim 1, wherein said digital data is a digital audio signal and said recording medium is a tape.

3. A digital data reproducing apparatus according to claim 1, wherein said memory control means includes encoding means for encoding the digital data to be written in said memory means to compressed data.

4. A digital data reproducing apparatus according to claim 3, wherein said reading means includes decoding means for decoding the compressed data into the original data.

5. A digital data reproducing apparatus according to claim 1, further comprising control memory means for storing address data indicating the location at which said first and second portions of said continuous digital data are recorded.

6. A digital data reproducing apparatus for reproducing continuous digital data from a recording medium on which said continuous digital data is divided into at least first and second portions which are respectively recorded at first and second locations of said recording medium which are spaced apart from each other, said digital data reproducing apparatus comprising:
   searching means for searching a part of at least one of said first and second portions when said recording medium is installed in said reproducing apparatus;
   memory means for storing said part searched by said searching means;
   reproducing means for reproducing said first portion of said continuous digital data by a reproducing head;
   moving means for moving said reproducing head and said recording medium relative to each other so that said reproducing head relatively moves from said first location to said second location; and
   means for reading out said part stored in said memory means while said reproducing head relatively moves from said first location to said second location, whereby said first and second portions of said continuous digital data are reproduced continuously.

7. A digital data reproducing apparatus according to claim 6, wherein said searching means searches the beginning part of at least said second portion.

* * * * *